United States Patent [19]
Goldberg

[11] 4,301,575
[45] Nov. 24, 1981

[54] PACKAGING CLIP

[76] Inventor: Ronald A. Goldberg, 89 Pinewood, Irvine, Calif. 92714

[21] Appl. No.: 49,425

[22] Filed: Jun. 18, 1979

[51] Int. Cl.³ .................. B65D 71/00; A44B 13/02
[52] U.S. Cl. .......................................... 24/1; 24/3 D; 24/159; 24/237; 24/355; 206/493; 294/158
[58] Field of Search ................ 24/1, 3 D, 3 H, 85 C, 24/86 C, 153, 159, 237; 206/493, 449; 401/19, 24; 224/45 W, 255; 294/87 R, 99 R, 99 S

[56] References Cited
U.S. PATENT DOCUMENTS

| | | | |
|---|---|---|---|
| 280,434 | 7/1883 | Zahm | 224/45 W |
| 374,898 | 12/1887 | Huoncker | 24/87 C |
| 430,903 | 6/1890 | Weil | 24/85 C |
| 443,425 | 12/1890 | Bonner | 24/159 |
| 772,887 | 10/1904 | Johnson | 24/85 C |
| 816,473 | 3/1906 | Johnson | 206/493 |
| 883,429 | 3/1908 | Singleton | 24/159 |
| 1,304,705 | 5/1919 | Powell | 24/85 C |
| 1,364,195 | 1/1921 | Harrer | 24/3 D |
| 1,413,131 | 4/1922 | Potter et al. | 24/85 C |
| 1,734,653 | 11/1929 | Talisman | 24/85 C |
| 2,222,831 | 11/1940 | Bitney | 224/45 W |
| 2,243,663 | 5/1941 | Wareham | 43/42.08 |
| 2,448,637 | 9/1948 | Swanson | 24/86 R |
| 3,148,991 | 9/1964 | Svendsen | 206/493 |
| 3,173,183 | 3/1965 | Miller | 24/86 C |
| 3,211,293 | 10/1965 | Tarnoff | 206/493 |
| 4,100,658 | 7/1978 | Nikota | 24/237 |

Primary Examiner—Victor N. Sakran
Attorney, Agent, or Firm—Fischer, Tachner & Strauss

[57] ABSTRACT

A clip for releasably securing at least one package of the type adapted for hanging on a display bracket, the clip comprising a bayonet portion for guiding the package onto a bracket, and a securing loop that is opened and closed by means of a spring-type locking mechanism, the loop and locking mechanism being integrally formed with the bayonet portion. In one embodiment, the locking mechanism comprises a V-shaped member having its apex extending below and in close proximity to the bayonet portion when the loop is closed.

9 Claims, 3 Drawing Figures

PACKAGING CLIP

BACKGROUND OF THE INVENTION

1. Field of the Invention

This invention relates generally to a device for facilitating the shipping and handling of articles of manufacture in packages that are adapted for support and display on rack mountable brackets. More specifically, the present invention relates to a novel device which makes it easier to apply pricing information to each of a plurality of product packages and also to provide a convenient means for sliding the entire plurality of such packages onto a display bracket, or whatever number is desired.

The mounting bracket with which the present invention is adapted for use, is of the type commonly found in places of retail trade such as hardware stores. Typically, a wall rack, such as a pegboard or other apertured surface, supports a plurality of mounting brackets each of which is adapted to support a stack of articles such as generally flat or partially flat packages, each such package typically containing a plurality of articles of manufacture and each such package having an aperture suitable for installing the package onto the bracket arm.

Typically, a mounting bracket comprises an elongated rod having a diameter in the range of ⅛ inch to ¼ inch and is of sufficient length to support a substantial plurality of the aforementioned packages. The brackets also include means for supporting the elongated rod in a substantially horizontal position extending away from the pegboard. Such means may comprise a portion welded to the rod and extending at least two support legs into holes of the pegboard or similar wall structure. The portion of the rod extending furthest from the pegboard is commonly bent at the very end in a slightly upward angular direction to minimize the likelihood of the packages inadvertently falling from the rod. Such brackets have proved highly advantageous as a means for both displaying and supporting a plurality of packages of articles of manufacture for retail sale. However, one disadvantage of such brackets is the time consumed and thus the expense involved in pricing and replacing such packages on such brackets after all or almost all of the packages, previously supported on such brackets, have been sold.

2. The Prior Art

One prior art U.S. Pat. No. 3,211,293 to Tarnoff discloses a device which attempts to overcome the time consuming task of replacing such packages on such brackets, one at a time. Tarnoff discloses a device comprising a tube extending through the aligned holes in a plurality of such packages in assembled relationship, the packages being secured to the tube by a rubberband. However, the Tarnoff device suffers from a disadvantage, namely the relative inconvenience in pricing the packages before placing a stack thereof on the bracket. This disadvantage results from the fact that, in accordance with Tarnoff, the packages are held in assembled relationship with virtually no space between such packages to permit a store employee to apply pricing information.

In addition to the above noted disadvantage of the aforementioned prior art, changes have occurred in the basic geometry of the mounting brackets and these changes have, for the most part, rendered the Tarnoff device impractical and inappropriate for use as originally contemplated. These changes to the bracket configurations have been primarily safety oriented to decrease the liklihood of injury that might be incurred when one inadvertently and forcefully comes in contact with the protruding end of the previously described bracket rods. By way of example, such changes include the use of a dual-rod bracket circuitously formed at the end thereof to avoid sharp or pointed ends and the dangers resulting therefrom. Another such change includes the addition of a sphere or sphere-like structure connected to the end of the rod whereby anyone inadvertently and forcefully coming in contact with that end will contact the sphere and thus not suffer the injuries that might otherwise arise from coming in contact with a sharp or pointed end of the prior brackets. The tube device taught by Tarnoff is also disadvantageous for use with gravity fed hook brackets wherein the tube would have to be employed in a substantially vertical configuration which may interfere with hooks and merchandise located above.

The above noted changes to the geometry of bracket rods, have resulted in configurations commonly referred to as safety hooks. Such safety hooks are being used with increasing frequency to avoid potential liability and particularly in view of government regulations for customer and employee safety. The device of Tarnoff and the teaching related thereto, which includes the placement of the aforementioned prior art tube over the protruding end of the bracket rod for sliding the assembled stack of packages along said tube and onto said rod, is inappropriate for use with such safety hooks. In addition, the Tarnoff prior art device is not practical for transferring fewer than all the packages contained thereon.

The present invention on the other hand, while still overcoming the aforementioned disadvantages and obviating the time consuming task of replacing packages one at a time on such brackets, may be readily used with the above described safety hooks as well as with the old style protruding rod that preceded the safety hooks.

SUMMARY OF THE INVENTION

The present invention is a clip of novel configuration comprising a triangularly bent portion and a straight or bayonet portion that is substantially parallel to the base of the triangular portion and is circuitously connected thereto by an integral C-shaped portion. One embodiment of the invention is fabricated from a spring-like metal of substantially rectangular cross-section such as spring steel that is used in making hairpins.

The triangularly bent portion acts as a locking mechanism as will be hereinafter described, so that the aforementioned packages for display may be placed on the bayonet portion and slid past the locking triangular portion to be retained in place thereby. Pricing information may be easily added to the packages retained on the clip because they are readily spaced from one another permitting easy access to each. All or some of the packages may be easily transferred from the clip to a mounting bracket in one assembled relationship by displacing the triangular portion of the clip and allowing the packages to slide from the bayonet portion onto the display bracket, all in one motion. Any packages retained on the clip of the present invention may then be conveniently stored in locked configuration.

It is therefore an object of the present invention to provide a package retention clip which facilitates the placement of a plurality of packages on a rack display bracket without incurring the disadvantages of the prior art.

It is another object of the present invention to provide a device for facilitating application of pricing information and placement of a plurality of packages onto a variety of different kinds of rack-mounted brackets including those of the safety hook configuration.

It is still another object of the present invention to provide a device for securing a plurality of packages in spaced relationship for facilitating the application of pricing information to each such package and thereafter to facilitate the transference of the plurality of packages to a display bracket.

It is still another object of the present invention to provide a novel structure for shipping, pricing and stacking apertured packages containing articles of manufacture to be displayed on a bracket supporting rod.

Other objects and advantages of the present invention will become apparent hereinafter from the detailed description of the invention taken in conjunction with the accompanying drawings in which:

DETAILED DESCRIPTION OF THE INVENTION

Figure 1:
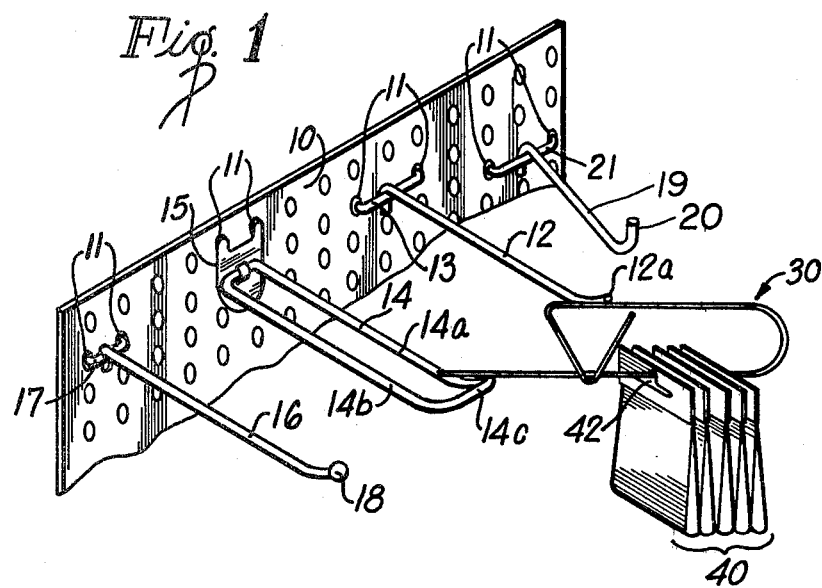
FIG. 1 is a three-dimensional drawing illustrating the manner in which the present invention is used to secure a stack of packages and to facilitate their transfer, in unison, to any one of several different types of display brackets.

Referring now to FIG. 1, there is shown therein a conventional bracket-supporting structure 10 such as a pegboard and the like having a plurality of apertures 11. Four different types of wall bracket devices 12, 14, 16, and 19 are shown inserted in four respective pairs of apertures 11. Bracket 12 is a conventional non-safety type previously discussed and having at its free end the protruding and non-protected angular member 12a. Bracket 12 is secured to pegboard 10 by means of a securing portion 13 which is welded to the remaining portion of the bracket and has legs inserted through apertures 11.

Bracket 14, on the other hand, is one of the safety types previously discussed. Safety is provided by avoiding the sharp, protruding end, of the non-safety version of a bracket 12. This is accomplished in bracket 14 by utilizing a pair of parallel bracket rods, 14a and 14b, which are joined by a semicircular portion 14c at the protruding end. Bracket 14 is secured to the pegboard 10 through apertures 11 by means of a vertical securing bracket 15.

The left-most bracket shown in FIG. 1, is another safety version, bracket 16, which is essentially identical to bracket 12 except for a relatively small sphere 18 which is welded or otherwise attached to the protruding end to provide a means for preventing injury when one forceably comes in contact with the bracket. Bracket 16 is secured to the pegboard 10 through apertures 11 by means of securing portion 17.

The right-most bracket of FIG. 1, namely bracket 19, is another non-safety type commonly called a gravity fed hook bracket. Bracket 19 is mounted on pegboard 10 in a downward angular position by mounting portion 21 and includes vertical member 20.

The Tarnoff patent, discussed previously, discloses the use of a tube which fits over the protruding end of the bracket. Clearly the use of a tube in that manner for brackets 14 and 16 would be impractical because of the substantially increased diameter that such a tube would be required to have to fit over the safety features provided by the safety-type brackets. On the other hand, the present invention may be used conveniently with any one of the four brackets shown in FIG. 1. As shown in FIG. 1, the inventive clip 30 has secured thereto a plurality of hanging packages 40 each adapted to fit over any one of the four brackets mounted to pegboard 10 by means of package apertures 42.

It is contemplated that the present invention is readily adapted for purposes of shipping a plurality of packages 40 from the manufacturer or distributor to the retailer whereby the entire plurality of packages 40 may be removed from the container after shipping. Pricing information may then be readily applied to each such package because of the substantial spacing between packages due to the manner in which they are secured by clip 30. When the packages have been priced and are ready for transfer to any of the four brackets of FIG. 1, the bayonet portion 32 of clip 30 is placed on top of a rod of bracket 12, 14, 16, or 19 at an angle of approximately 45 degrees with respect to the normal to the pegboard 10 and preferably at the junction between the horizontal portion of the bracket and the angular or vertical end portion of the bracket. By way of example, as shown in FIG. 1 the bayonet portion 32 of clip 30 has been placed on top of bracket 14 at about the junction between rod 14a and semicircular portion 14c. By using the invention in this manner, portion 14c of bracket 14 acts as a natural resistance to the bayonet portion 32 of clip 30 thereby securing the contact between the bayonet portion of clip 30 and bracket 14. Thus, as illustrated in FIG. 1, with clip 30 configured with respect to bracket 14 as shown, clearly the next step in the process of transferring packages 40 onto bracket 14 is that of simply pushing the packages to the left along the bayonet 32 forcing the triangularly bent portion of the clip 30 upwardly and rotating it out of its locked position, thus allowing all or some of packages 40 to be slid onto bracket 14.

Clearly the identical operation is performed on transferring packages 40 from clip 30 to either one of the other four brackets 12, 16 and 19.

Figure 2:
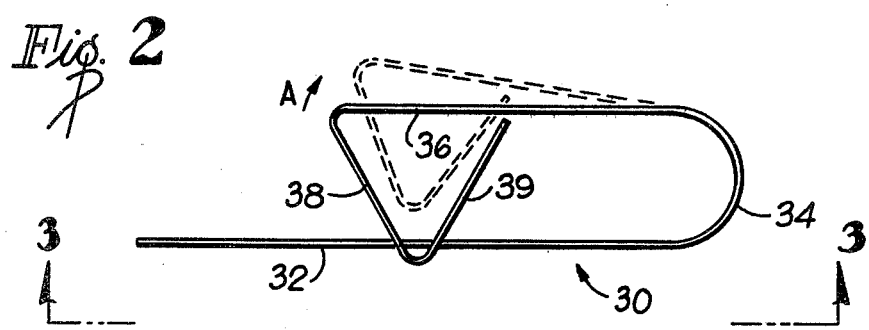
FIG. 2 is an elevation view of the invention illustrating the manner in which the locking triangular portion of the invention is caused to rotate up when a plurality of packages, secured to the invention, is to be transferred to a display bracket.
Figure 3:
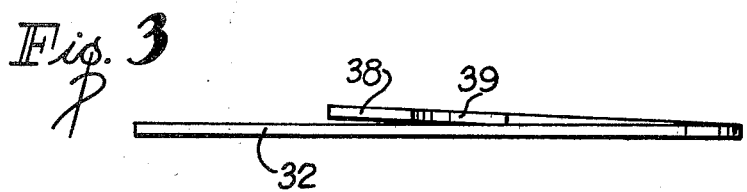
FIG. 3 is a bottom view of the present invention as viewed along line 3—3 of FIG. 2.

The detailed structure of clip 30 may be better understood by referring to FIGS. 2 and 3 which provide larger scale views of the invention. As illustrated therein, clip 30 comprises a bayonet portion 32 which is circuitously connected to a spaced parallel portion 36 by means of an integral C-shaped portion 34. Straight portion 36 terminates as one leg of a triangularly bent portion wherein the second and third legs are identified as legs 38 and 39 respectively. The curved junction between legs 38 and 39 normally falls slightly below the bayonet portion 32 whereby the triangularly bent portion acts as a locking mechanism for packages inserted onto the bayonet portion and located thereon between the triangularly bent portion and the C-shaped portion 34. In order to place packages 40 into a secured position on clip 30 or to remove such packages from the clip to transfer them to a bracket, the triangularly bent portion is rotated up and out of its locking position with respect to the bayonet portion 32, as illustrated by the dotted lines and the arrow A in FIG. 2. This upward rotation results from the slight horizontally directed pressure against either of legs 38 and 39 when packages 40 are being inserted into or removed from clip 30.

As further shown in FIG. 2, the triangularly bent portion, including the entire parallel straight portion 36, is rotated upward to the position indicated by the dotted lines whereby the curved junction between legs 38 and 39 is raised above the bayonet portion 32 until a sufficient space is produced therebetween whereby packages 40 may be slid in either direction past the triangularly bent portion along bayonet portion 32. Because clip 30 is preferably made of flexible spring steel of the type commonly used in manufacturing hairpins, the triangularly bent portion of clip 30 is easily rotated into the non-locking position as packages 40 are pushed along bayonet portion 32, and then readily springs back into its locking position.

It will now be understood that what has been described herein is a novel article of manufacture in the form of a clip adapted to facilitate the shipping, pricing and handling of a plurality of product packages and to provide a convenient means for sliding any portion or the entire plurality of such packages onto any one of a variety of display brackets including those of the safety type. The clip, although of relatively simple geometry and thus readily manufactured at low cost, is nonetheless of a unique self-locking configuration that permits securing a plurality of such packages in assembled relationship but with sufficient spacing therebetween to permit easy application of pricing information to such packages prior to their being transferred to a display bracket.

Although a preferred embodiment of the invention has been disclosed in detail sufficient to enable one skilled in the art to make and use the invention, it will now be understood in view of applicant's teaching herein, that variations in materials, dimensions and geometry are contemplated as being within the scope of the present invention, which is limited only by the appended claims. By way of example, the described triangular locking mechanism may be circular instead.

I claim:

1. A device for releasably securing at least one package of the type having an aperture therethrough wherein the package may be hung on a bracket for supportive display, the device comprising:
    a first substantially straight elongated member having a free end adapted to overlie said bracket,
    a second substantially straight member shorter than said first member and in spaced-apart, substantially parallel relation thereto,
    an arcuate member integrally connecting said first and second straight members, and
    a spring-type locking mechanism located between said first and second straight members, integral to said second member and extending beyond said first member in proximate relation thereto to form a substantially circuitous structure comprising said locking mechanism, said arcuate member, and said first and second straight members,
    said spring-type locking mechanism adapted to being resiliently urged away from said first member and toward said second member by the force of transferring said packages to open said circuitous structure whereby said packages may be transferred along said first member into and out from said circuitous structure concurrently with the unlocking of said locking mechanism.

2. The device as defined in claim 1, wherein said spring-type locking mechanism is substantially triangular.

3. The device as defined in claim 2, wherein a portion of said second substantially straight member forms one leg of said triangular locking mechanism.

4. The device as defined in claim 1, wherein said spring-type locking mechanism is substantially circular.

5. The device as defined in claim 1, wherein said first and second straight members, said arcuate member and said locking mechanism are all formed of spring steel of uniform cross section.

6. The device as defined in claim 5, wherein said uniform cross section is rectangular.

7. The device as defined in claim 1, wherein said first and second substantially straight members, said arcuate member and said locking mechanism are all formed from a unitary structure of substantially uniform cross section.

8. An article of manufacture of unitary construction comprising a flexible elongated cylindrical structure shaped to form a package holding clip, said clip comprising:
    an open-ended loop having an elongated bayonet portion extending beyond said open end, and
    a flexible locking mechanism adapted to selectively open and close said loop in response to the transfer of an apertured package from one side of said loop to another whereby an apertured package secured in said loop may be released therefrom and transferred onto said bayonet portion for removal from said clip,
    said locking mechanism having a substantially V-shaped portion of said cylindrical structure, said V-shaped portion being substantially in the plane of said loop with its apex extending beyond said bayonet portion when said loop is closed.

9. The article of manufacture defined in claim 8, wherein said flexible elongated cylindrical structure comprises spring steel of uniform cross section.

* * * * *